United States Patent
Mancosu et al.

(10) Patent No.: US 7,954,367 B2
(45) Date of Patent: Jun. 7, 2011

(54) TYRE COMPRISING A DEVICE FOR DETECTING AT LEAST A CHARACTERISTIC PARAMETER OF THE TYRE ITSELF, AND A MANUFACTURING METHOD THEREOF

(75) Inventors: Federico Mancosu, Milan (IT); Massimo Brusarosco, Milan (IT); Anna Paola Fioravanti, Milan (IT); Fabio Mariani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 249 days.

(21) Appl. No.: 11/887,404

(22) PCT Filed: Mar. 31, 2005

(86) PCT No.: PCT/IT2005/000175
§ 371 (c)(1),
(2), (4) Date: Sep. 11, 2009

(87) PCT Pub. No.: WO2006/103706
PCT Pub. Date: Oct. 5, 2006

(65) Prior Publication Data
US 2009/0320580 A1    Dec. 31, 2009

(51) Int. Cl.
*G01M 17/02* (2006.01)
(52) U.S. Cl. .......................................... 73/146; 152/246
(58) Field of Classification Search .................. None
See application file for complete search history.

(56) References Cited

U.S. PATENT DOCUMENTS

| 6,030,478 | A | 2/2000 | Koch et al. |
| 6,217,683 | B1 | 4/2001 | Balzer et al. |
| 6,386,251 | B1 | 5/2002 | Koch et al. |
| 7,361,243 | B2 | 4/2008 | Ogawa |
| 2003/0046992 | A1* | 3/2003 | Caretta ............................ 73/146 |
| 2004/0094251 | A1 | 5/2004 | Strache et al. |
| 2004/0216520 | A1* | 11/2004 | Caretta ............................ 73/146 |
| 2005/0257609 | A1* | 11/2005 | Mancosu et al. ................ 73/146 |
| 2007/0171034 | A1* | 7/2007 | Mancosu et al. .............. 340/438 |
| 2007/0240501 | A1* | 10/2007 | Mancosu et al. ................ 73/146 |
| 2007/0256485 | A1* | 11/2007 | Rensel et al. .................... 73/146 |
| 2007/0295069 | A1* | 12/2007 | Mancosu et al. ................ 73/146 |
| 2008/0035259 | A1* | 2/2008 | Mancosu et al. .............. 152/246 |
| 2008/0103659 | A1* | 5/2008 | Mancosu et al. ................. 701/41 |
| 2009/0115590 | A1* | 5/2009 | Brusarosco et al. ........... 340/444 |
| 2009/0277262 | A1* | 11/2009 | Rensel et al. .................... 73/146 |
| 2010/0007465 | A1* | 1/2010 | Benedict ...................... 340/10.1 |
| 2010/0122757 | A1* | 5/2010 | Lionetti et al. ............. 152/152.1 |

FOREIGN PATENT DOCUMENTS

| EP | 0 936 089 A2 | 8/1999 |
| EP | 1 078 780 A2 | 2/2001 |
| EP | 0 976 535 B1 | 9/2002 |
| JP | 2004-17383 | 1/2004 |

\* cited by examiner

*Primary Examiner* — Andre J Allen
(74) *Attorney, Agent, or Firm* — Finnegan, Henderson, Farabow, Garrett & Dunner, L.L.P.

(57) ABSTRACT

Fastened to a tire is a detecting device consisting of a detecting unit including a sensor associated with an annular antenna having an inner perimetral edge, and an anchoring body having a base portion with a fastening surface secured to the radially internal surface of the tire. The detecting unit is removably brought into engagement with the anchoring body by insertion of the inner perimetral edge of the antenna into a perimetral groove formed between the base portion and a retaining portion. The anchoring body has an overall height of about 0.2 to about 1.5 times a maximum distance measure between two mutually spaced apart points along the inner perimetral edge.

67 Claims, 4 Drawing Sheets

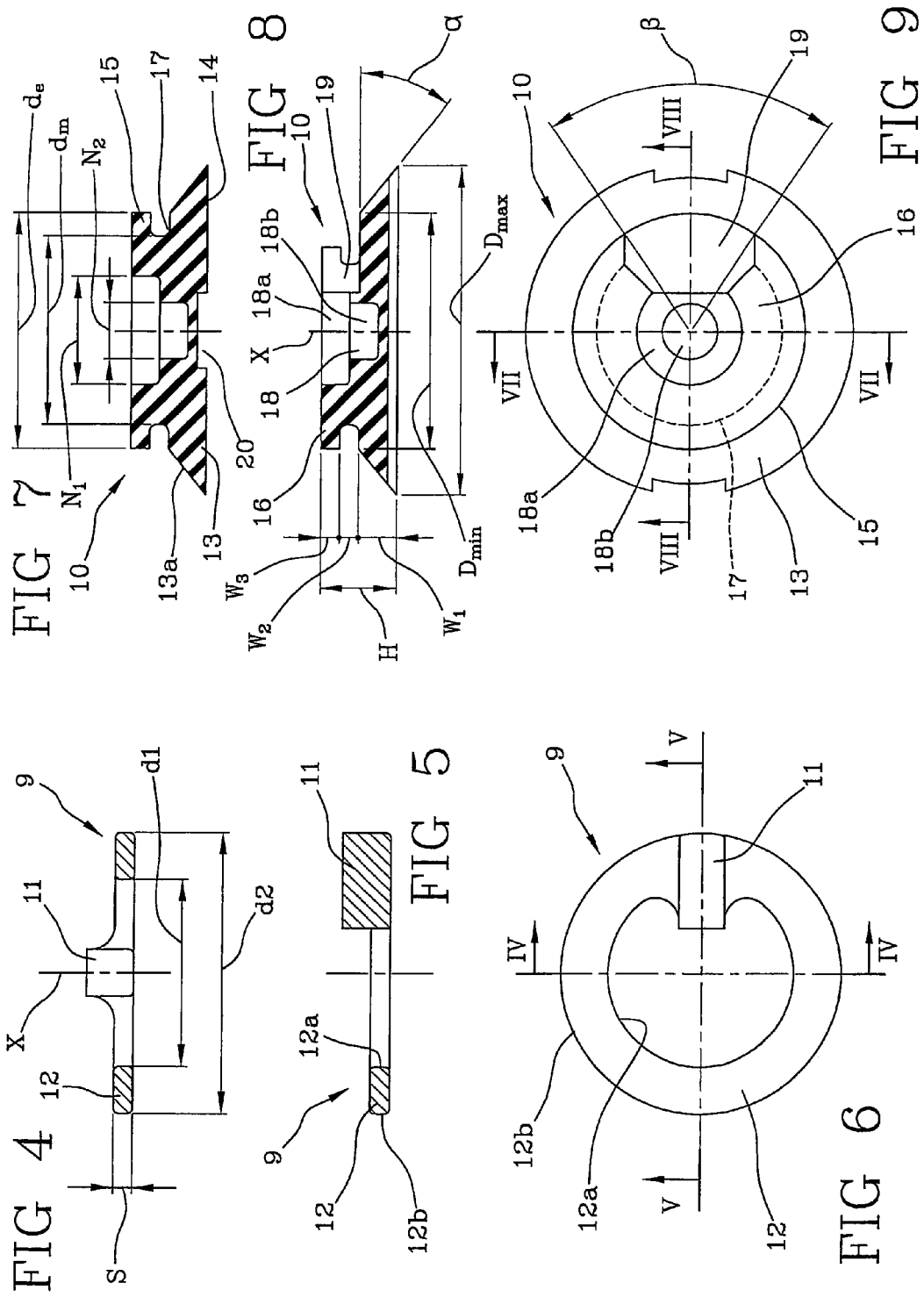

TYRE COMPRISING A DEVICE FOR DETECTING AT LEAST A CHARACTERISTIC PARAMETER OF THE TYRE ITSELF, AND A MANUFACTURING METHOD THEREOF

CROSS REFERENCE TO RELATED APPLICATION

This application is a national phase application based on PCT/IT2005/000175, filed Mar. 31, 2005, the content of which is incorporated herein by reference.

BACKGROUND OF THE INVENTION

1. Field of the Invention

The present invention relates to a tyre comprising a device for detecting at least one characteristic parameter of the tyre itself. Said invention also relates to a method of manufacturing said tyre.

2. Description of the Related Art

On some types of vehicles the necessity is felt to monitor the operating conditions of the tyres and to possibly keep traces of the evolution in time of some characteristic operating parameters. For instance, when vehicles using tyres of the run flat type are concerned, i.e. tyres capable of ensuring some kilometers of distance covered even in case of tyre deflation, provided some characteristic parameters are complied with such as maximum speed, temperature and maximum distance to be traveled over, the above requirement is particularly felt for safe use of said type of tyres.

The characteristic parameters that are generally considered may be identification code, temperature, pressure, distance run by the tyre, as well as parameters originating from mathematical calculations that can be carried out within the tyre or on board the vehicle.

To this aim, within the tyre a detecting device can be mounted which can comprise at least one sensor, possibly associated with a control unit and/or a data storage unit (such as a microprocessor) and an antenna; said antenna has the task of enabling radio-frequency signal exchange with the devices mounted on board the vehicle.

In addition, the antenna can allow the system present within the tyre to be suitably powered without using independent powering units (e.g. batteries within the tyre). Therefore, the apparatus mounted on board the vehicle are provided to generate an electromagnetic field with which the antenna placed in the tyre can be coupled by induction, and by virtue of which the necessary energy for operation of the sensor and the possible control unit is supplied by the antenna itself.

U.S. Pat. No. 6,217,683 proposes a detecting device in which a detecting unit is removably in engagement with a retaining system fixed to an inner surface of the tyre by a layer of rubberised cloth. The retaining system may comprise fastening tapes to be torn off, set to encircle the detecting unit, or fitting elements in the form of indented pins for example, to be engaged by snap-fitting into respective openings arranged in the detecting unit. In another embodiment, the retaining system comprises one or more button-like elements formed of a stem carrying a swollen head to be inserted into a through opening set in the detecting unit. The detecting unit is subsequently moved to engage the stem along a slide slot extending from the through opening and having a smaller width than the swollen end, so that the detecting unit is retained.

In U.S. 2004/0094251 a detecting unit is connected by snap-engagement to a stem fastened to the inner surface of the tyre and carrying a swollen end, so as to cause a steady geometric engagement between the parties.

Within this technological scope, the Applicant has felt the necessity:
- to improve the manufacture simplicity of a detecting device;
- to enable removability of at least one component of said device ensuring reliability of the device itself;
- to ensure an important mechanical uncoupling of the components of said device (at least of the antenna and sensor, for example) from stresses generated on the device itself, by the tyre during running;
- to enable operation also under conditions of lack of pressure within the tyre;
- to enable a simple application of said device to an already manufactured tyre, without affecting the operational features of the tyre itself.

In addition, the Applicant has also felt the necessity to carry out a detecting device adapted to be integrated into the tyre during manufacture.

SUMMARY OF THE INVENTION

The Applicant has found that by associating a detecting unit with an anchoring body of substantially flattened conformation, a considerable manufacturing simplification can be achieved and unexpected improvements can be obtained both in terms of reliability of engagement between the detecting unit and the tyre, and in terms of practical operation of the detecting unit itself.

In particular, in a first aspect, the invention relates to a tyre for vehicle wheels, comprising:
- a substantially toroidal carcass structure, comprising at least one carcass ply having axially opposite end flaps in engagement with respective annular structures for anchoring to a mounting rim;
- a belt structure circumferentially applied to the carcass structure at a radially external position;
- a tread band circumferentially applied to the belt structure at a radially external position;
- a pair of sidewalls each extending between one of said annular anchoring structures and a side edge of the tread band;
- a detecting device to detect at least one characteristic parameter of said tyre, which device is applied to the carcass structure at a radially internal position, wherein the detecting device comprises:
- a detecting unit including an antenna having an inner perimetral edge and a sensor operatively connected to said antenna;
- an anchoring body having a base portion with a fastening surface secured to a radially internal surface of the tyre; a retaining portion associated with the base portion and having a top surface facing away from the fastening surface; a perimetral groove being formed between the base portion and retaining portion, so that the detecting unit is removably in engagement with the anchoring body through the inner perimetral edge of the antenna fitted in the perimetral groove following elastic deformation of the retaining portion;

wherein the anchoring body has an overall height measured between the fastening surface of the base portion and the top surface of the retaining portion, included between about 0.2 and about 1.5 times a maximum distance measured between two mutually spaced apart points along said inner perimetral edge.

Thus an advantageous reduction in the device masses is obtained, and consequently in the stresses induced on the device components by effect of the important accelerations due to rolling of the tyre, while keeping the possibility of giving the antenna proper sizes so as to ensure an efficient radio-frequency interaction between the detecting unit and receiving/transmitting unit installed on board the vehicle.

The Applicant has further ascertained that the above advantages such as mass and stress reduction, and the efficient interaction between the detecting and receiving units are achieved to an optimal degree in a preferential advantageous embodiment in which the overall height, measured between the fastening surface of the base portion and the top surface of the retaining portion, is included between about 0.3 and about 0.6 times the maximum distance measured between two mutually spaced apart points along said inner perimetral edge.

In the present specification and in the subsequent claims, referred to a preferential embodiment in which the antenna and anchoring body have a substantially circular conformation, some features of the device will be, for simplicity's sake, expressed in terms of diametrical measures of the constituent elements. However the possibility also exists of setting an antenna and/or an anchoring body extending in a non-circular conformation, e.g. of elliptic or polygonal shape. In this case, to the aims of the present specification and the following claims, each feature expressed in terms of diametrical measure is to be intended as expressed in terms of maximum distance measured between two mutually spaced apart points along the perimetral extension of the constituent element to which the same diametrical measure is referred.

In a preferential embodiment it is also provided for the anchoring body to have at least one central cavity extending from the top surface towards the fastening surface.

In this manner the elastic deformability of the retaining portion of the anchoring body is increased, so that the mounting operations of the detecting unit are simplified, the reliability of anchoring being improved while still having the possibility of easily removing said detecting unit for replacement or installation on another tyre.

Further advantages as regards simplicity of assembling and disassembling of the detecting unit, with and from the anchoring body, can be obtained by setting at least one housing recess for the sensor in the retaining portion.

In a different aspect, the present invention relates to a detecting device for detection of at least one characteristic parameter of a tyre, comprising:
  a detecting unit including an antenna having an inner perimetral edge, and a sensor operatively connected to said antenna;
  an anchoring body having a base portion with a fastening surface adapted to be secured to a internal surface of the tyre; a retaining portion associated with the base portion and having a top surface facing away from the fastening surface; a perimetral groove being formed between the base portion and retaining portion, so that the detecting unit is removably in engagement with the anchoring body through the inner perimetral edge of the antenna fitted in the perimetral groove following elastic deformation of the retaining portion;
wherein the anchoring body has an overall height, measured between the fastening surface of the base portion and the top surface of the retaining portion, included between about 0.2 and about 1.5 times a maximum distance measured between two mutually spaced apart points along said inner perimetral edge.

In a third aspect, the present invention relates to a method of assembling said detecting device to a tyre, said method comprising the steps of:
  manufacturing the tyre;
  moulding and curing the tyre;
  securing the fastening surface of said detecting device, by adhesion, to a radially internal surface of the tyre.

In accordance with a further aspect of the invention, it is proposed a method of manufacturing a tyre for vehicle wheels integrating a device for detecting at least one characteristic parameter of said tyre, said detecting device comprising a detecting unit removably in engagement with an anchoring body, said method comprising the steps of: setting a toroidal support conforming in shape to the inner conformation of said tyre; introducing raw elastomeric material into a forming cavity arranged on an outer surface of the toroidal support and the shape of which matches that of the anchoring body of the detecting device; forming at least one carcass ply on the outer surface of the toroidal support; assembling construction components of the tyre with the carcass ply; curing the tyre so that the elastomeric material introduced into the forming cavity may form said anchoring body steadily associated with the radially internal surface of the tyre; removing the toroidal support from the cured tyre; engaging the detecting unit with the anchoring body following elastic deformation of a portion of the anchoring body.

BRIEF DESCRIPTION OF THE DRAWINGS

Further features and advantages will become more apparent from the detailed description of a preferred, but not exclusive, embodiment of a tyre comprising a device for detecting at least one characteristic parameter of the tyre itself and of the manufacturing method thereof, in accordance with the present invention. This description will be set out hereinafter with reference to the accompanying drawings, given by way of non-limiting example, in which:

FIG. 4 shows a detecting unit being part of the detecting device, sectioned along the diametrical line IV-IV in FIG. 6;

FIG. 5 shows the detecting unit sectioned at right angles to the section plane in FIG. 4, i.e. along the diametrical line V-V in FIG. 6;

FIG. 6 shows the detecting unit seen in plan view;

FIG. 7 shows an anchoring body being part of the detecting device, sectioned along the diametrical line VII-VII in FIG. 9;

FIG. 8 shows the anchoring body sectioned at right angles to the section plane in FIG. 7, i.e. along the line VIII-VIII in FIG. 9;

FIG. 9 shows the anchoring body seen in plan view;

DETAILED DESCRIPTION OF THE INVENTION

Figure 1:
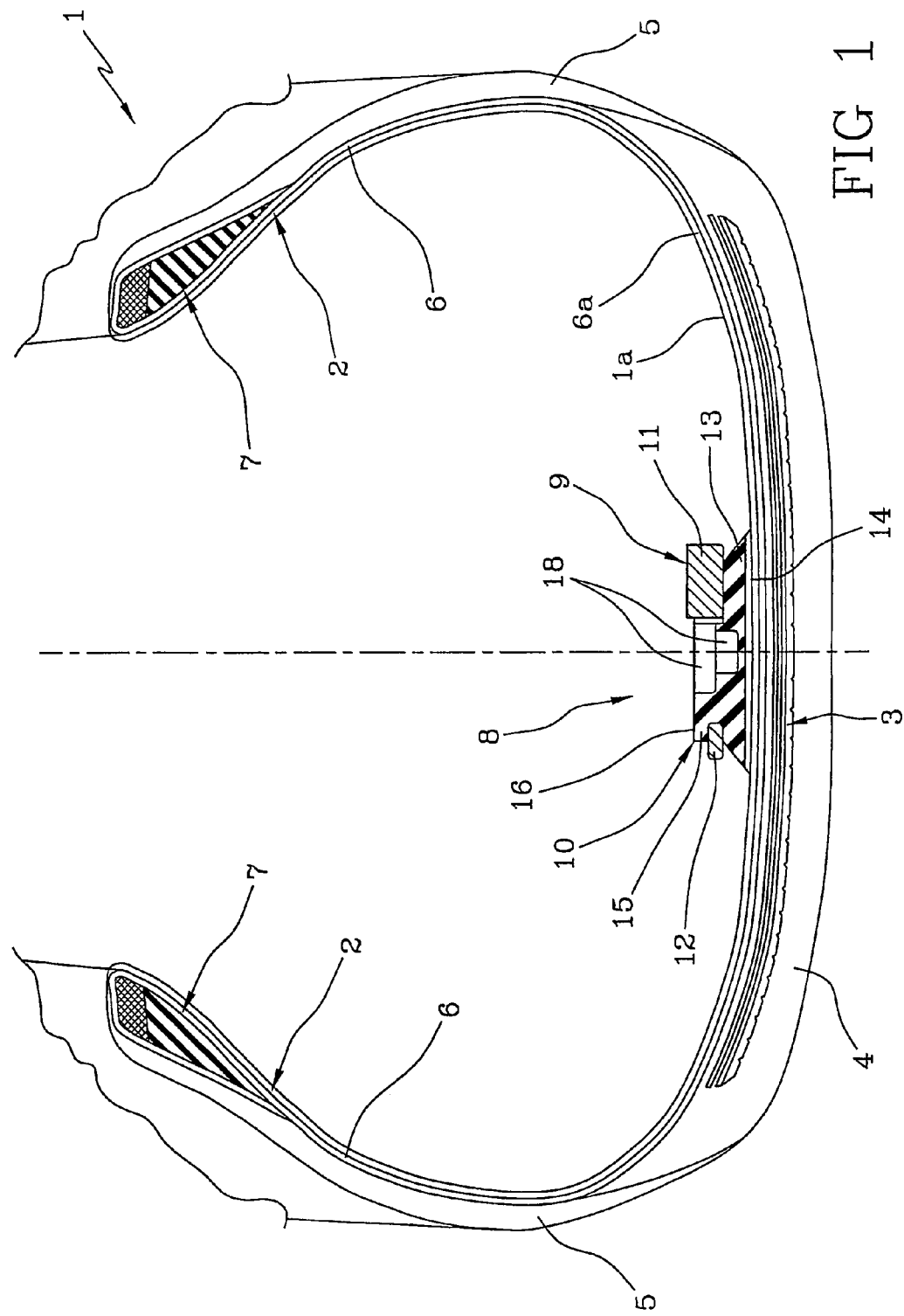
FIG. 1 diagrammatically shows a diametrical half-section of a tyre incorporating a detecting device in accordance with the present invention, sectioned along line I-I in FIG. 3.
Figure 2:
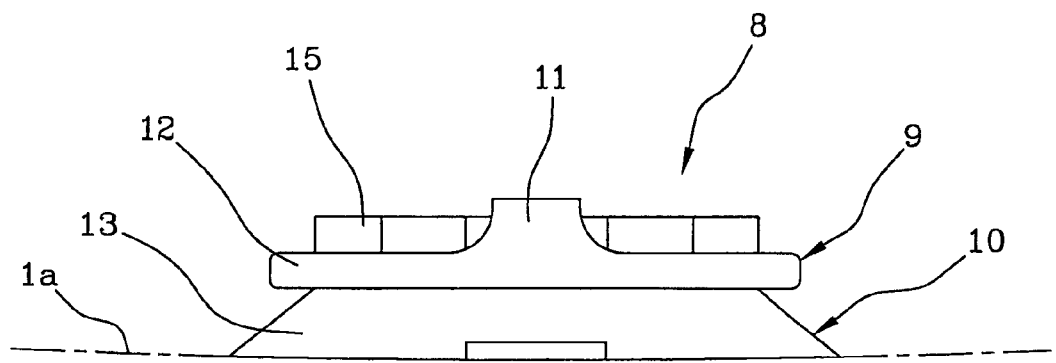
FIG. 2 shows the device in FIG. 1 seen along the direction II in FIG. 3.
Figure 3:
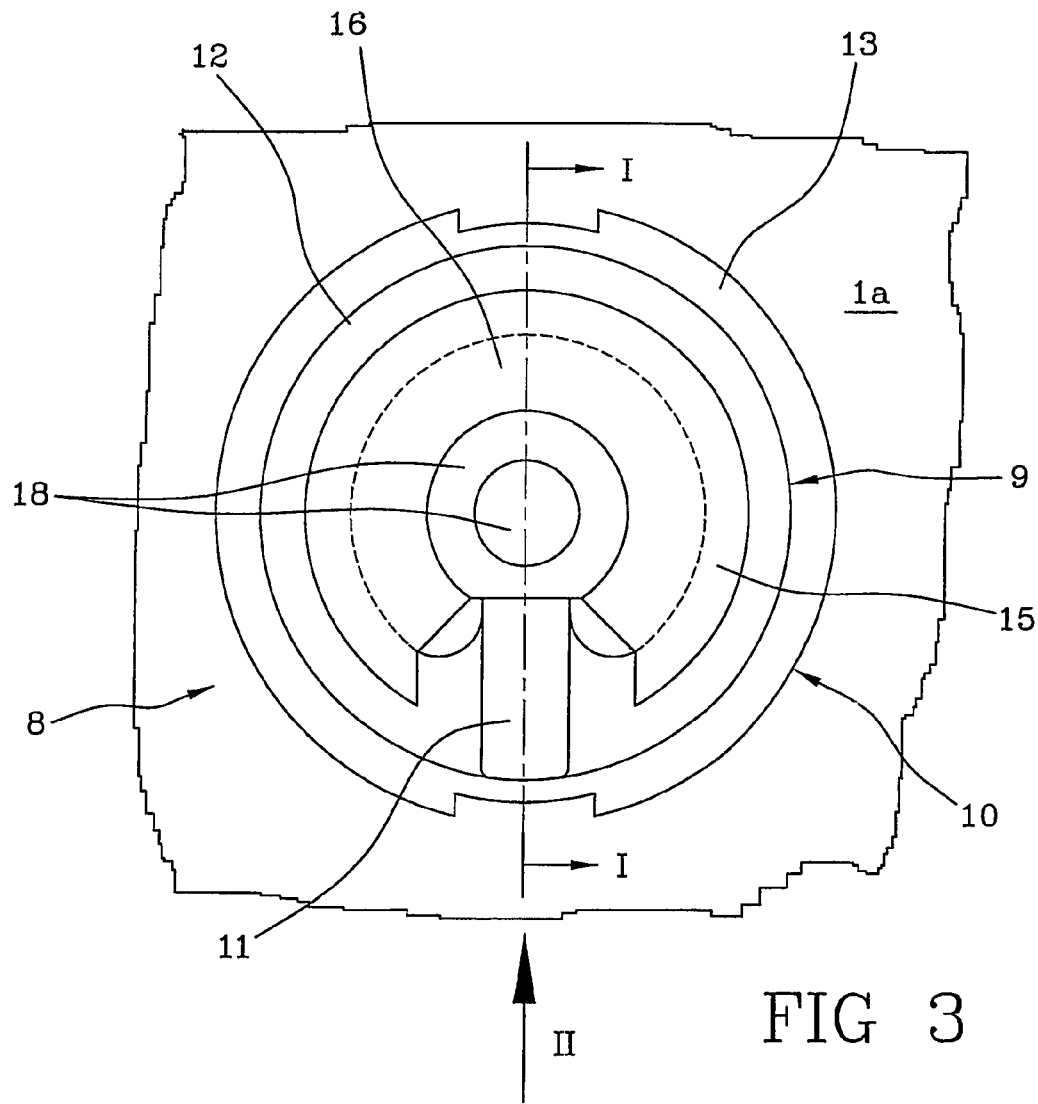
FIG. 3 is a plan view of the detecting device applied to the inner surface of the tyre.

With reference to the drawings, a tyre for vehicle wheels in accordance with the present invention has been generally denoted at 1.

Tyre 1 comprises a carcass structure 2 of substantially toroidal conformation, a belt structure 3 circumferentially extending around the carcass structure 2, a tread band 4 applied to the belt structure 3 at a circumferentially external position, and a pair of sidewalls 5 laterally applied to the carcass structure 2 on opposite sides and each extending from a side edge of the tread band 4 until close to a radially internal edge of the carcass structure itself. Each of the sidewalls 5 and the tread band 4 essentially comprise at least one layer of elastomeric material of suitable thickness.

It is to be pointed out that, to the aims of the present specification, by the term "elastomeric material" it is intended a composition comprising at least one elastomeric polymer and at least one reinforcing filler. Preferably, this composition further comprises additives such as cross-linking agents and/or plasticizers, for example. Due to the presence of the cross-linking agents, this material can be cross-linked through heating, so as to form the final article of manufacture.

The carcass structure 2 comprises one or more carcass plies 6 having axially opposite end flaps that are steadily secured to a pair of annular anchoring structures 7, integrated into regions usually identified as tyre "beads". The carcass ply 6 can be internally coated with a so-called "liner" 6a, i.e. a thin layer of elastomeric material impervious to air or other inflating fluid usually introduced into the tyre under use conditions, which liner extends over the whole extension of the radially internal surface 1a of tyre 1.

A detecting device generally identified with 8 is disposed on the radially internal surface 1a of tyre 1, preferably at an equatorial plane of the tyre itself. The detecting device 8 is set to interact with an electronic unit installed on board the vehicle, not shown or further described as it can be made in a manner known by itself. Said detecting device 8 is set to detect, store and/or signal one or more characteristic parameters of the tyre mounted on the vehicle. These characteristic parameters for example can be represented by an identification code, the value of the inflating pressure, temperature, covered distance and/or other parameters also originating from mathematical calculations that can be carried out either by the detecting device 8 itself within tyre 1, or by the electronic unit on board the vehicle.

To this aim, the detecting device 8 essentially comprises a detecting unit 9 removably in engagement with an anchoring body 10 of elastomeric material, in turn fastened against the radially internal surface 1a of tyre 1. The detecting unit 9 essentially comprises at least one sensor 11 operatively associated with an antenna 12 preferably of an annular conformation with circular extension, having an inner perimetral edge 12a and an outer perimetral edge 12b. The antenna 12 to be obtained by a conductive element possibly incorporated into a support of plastic material, is in the form of a flattened ring, in which the inner diameter "$d_1$" is larger, preferably 1.5 to 5 times, than the difference between the outer diameter "$d_2$" and the inner diameter "$d_1$" itself. In a preferential embodiment, the inner diameter "$d_1$" and outer diameter "$d_2$" correspond to 20 mm and 30 mm, respectively. In addition, the antenna 12 has a thickness "S" included by way of indication between 1 and 3 mm, of about 2 mm for example, measured in parallel to a geometric axis "X" of the antenna 12 itself and/or the detecting device 8 taken as a whole.

Sensor 11, associated with a microprocessor made in the form of an integrated circuit for example, possibly incorporated into the same plastic material incorporating the conductive element of the antenna 12, preferably has a substantially prismatic conformation and preferably axially projects from one side of the antenna 12 and radially juts out relative to the inner perimetral edge 12a of the antenna itself.

Sensor 11 is set to talk to the electronic unit positioned on board the vehicle through the antenna 12, that can be also used to power the sensor itself and/or other devices contained in the detecting unit 9, so as to avoid use of independent powering units within the tyre 1. In fact, the antenna 12 lends itself to be coupled with an electromagnetic field generated by the electronic unit present on board the vehicle and draw the necessary energy for power supply of the detecting unit 9. Data exchange between sensor 11 and said electronic unit takes place through radio-frequency signal transmission and reception (RF signals), the frequency of which can be included between about 100 kHz and about 500 MHz, and preferably can correspond to about 125 kHz. Therefore co-operation between the electronic unit located on board, the antenna 12 and detecting unit 9 constitutes a detecting system enabling the detecting unit 9 also to operate without batteries or similar powering units mounted within tyre 1.

The anchoring body 10 preferably having a circular configuration or in any case a configuration consistent with the perimetral extension of the antenna 12, exhibits a base portion 13 provided with a fastening surface 14 anchored or susceptible of steady anchoring to the radially internal surface 1a of tyre 1.

On the opposite side from the fastening surface 14, the base portion 13 carries a retaining portion 15 having a top surface 16 facing away from the fastening surface 14 itself. Formed between the base portion 13 and retaining portion 15 is a perimetral groove 17 adapted to removably receive the inner perimetral edge 12a of the antenna 12, insertable into the groove itself following elastic deformation of the retaining portion 15.

Advantageously, the anchoring body 10, preferably made of elastomeric material having a hardness included between 35° and 60° Shore A, preferably between 40° and 55° Shore A, has an overall height "H" measured between the fastening surface 14 and top surface 16, included between about 0.2 and about 1.5 times the diameter of the inner perimetral edge 12a of the antenna 12, or in any case the maximum distance measured between two mutually spaced apart points along said inner perimetral edge 12a. Preferably, the height "H" is included between about 0.3 and about 0.6 times said maximum distance measured between two mutually spaced apart points along said inner perimetral edge 12a. In the embodiment shown, the overall height "H" corresponds to ⅖ of the inner diameter "$d_1$" of the antenna 12.

The above specified value range gives the anchoring body 10 a substantially flattened configuration which is fairly extended on the inner surface 1a of tyre 1. In this way it is possible to be sure that the centre of gravity of the detecting device 8 will keep a rather reduced distance relative to the inner surface 1a of the tyre. This fact reduces the deformations to which the anchoring body 10 is submitted by effect of the strong accelerations induced thereto during rolling of tyre 1 also at high speed, so as to eliminate the risk that the detecting unit 9 may disengage from the anchoring body 10 by effect of said stresses. Values of the $H/d_1$ ratio higher than the stated ones could in fact cause an excessive deformation capability of the anchoring body, the antenna sizes being the same, due to the centre of gravity of the device 8 moving away from the radially internal surface 1a of the tyre, and also due to an increase in the device masses. The high accelerations induced during rolling of tyre 1 on the radially internal surface 1a, above all at high speed, could also generate stresses capable of causing damages and/or detachments either of the detecting unit 9 from the anchoring body 10, or of the anchoring body 10 itself from the radially internal surface 1a of the tyre. For ratio values smaller that those stated, during use of tyre 1, excessive deformations could occur at the perimetral groove 17, which would result in stresses on the detecting unit 9 that could impair the practical operation of said unit 9 and/or cause separation of the latter from the anchoring body 10.

In addition, the above specified parameters enable an antenna 12 of a relatively high diameter to be utilised, to the benefit of the effectiveness of the linkage with the flux produced by the electronic unit mounted on board the vehicle, while at the same time enabling an advantageous reduction in the masses of the device 8 taken as a whole.

To promote a satisfactory engagement between the detecting unit 9 and anchoring body 10, the perimetral groove 17 is preferably provided to extend according to a profile that geometrically matches the conformation of the inner perimetral edge 12a of the antenna 12. In more detail, to this aim the perimetral groove 17 has a minimum diameter "$d_m$" of a value equal to and preferably included between 97% and 103% of the inner diameter "$d_1$" of the antenna 12. Likewise, the width "$W_2$" of the perimetral groove 17, measured in parallel to the geometric axis "X", is substantially equal to and preferably included between 97% and 103% of the thickness "S" of the antenna 12. Values of minimum diameter "$d_m$" and/or width "$W_2$" of the groove 12 smaller than the above stated limits could cause relative movements and consequent shocks that can damage the detecting unit 9 and/or anchoring body 10.

To enable easy engagement and disengagement of the detecting unit 9 with and from the anchoring body 10 and at the same time ensure steadiness of the detecting unit 9 when engagement has occurred, the retaining portion 15 has an outer diameter "$d_e$" larger than the inner diameter "$d_1$" of the antenna 12. In more detail, the outer diameter "$d_e$" of the retaining portion 15 can be included, by way of indication, between 110% and 150%, and can correspond to about 125% for example, of the inner diameter "$d_1$" of the antenna 12. In addition, the retaining portion 15 has a height "$W_3$" measured in parallel to the geometric axis "X", included between 90% and 140%, and equal to about 125% for example, of the width "$W_2$" of the perimetral groove 17.

Values of outer diameter "$d_e$" and/or height "$W_3$" smaller than the stated values could cause an excessive weakening of the retaining portion 15. Vice versa, values of outer diameter "$d_e$" and/or height "$W_3$" higher than the stated values would make fitting of the inner circumferential edge of the antenna 12 into the groove 17 too difficult.

To facilitate this fitting operation, it is also preferable for the outer diameter "$d_2$" of the antenna 12 to be larger than the outer diameter "$d_e$" of the retaining portion 15.

It may be also advantageously provided that a central cavity 18 extending from the top surface 16 towards the fastening surface 14 be formed in the anchoring body 10. The presence of the central cavity 18 allows deformability of the retaining portion 15 to be optimised to facilitate coupling of the anchoring body 10 with the detecting unit 9.

Preferably, the central cavity 18 has an axial extension at least equal to the axial size, i.e. height "$W_3$", of the retaining portion 15 added to the axial size, i.e. width "$W_2$", of the perimetral groove 17. In the embodiment shown the central cavity 18 extends as far as about 2 mm from the fastening surface 14.

Preferably identifiable in the central cavity 18 is a primary portion 18a extending from the top surface 16 and having a diameter "$N_1$" smaller than the inner diameter "$d_m$" of the perimetral groove 17, and an end portion 18b of a diameter "$N_2$" smaller than the diameter of the primary portion 18a. At least at the primary portion 18a, the diameter "N" of the central cavity 18 corresponds, by way of indication, to 60% of the inner diameter "$d_m$" of the perimetral groove 17, and in any case is preferably included between 40% and 70% of the inner diameter "$d_m$" of the groove itself. It is also preferably provided that, at least at the primary portion 18a, the ratio of the diameter "$N_1$" of the central cavity 18 to the outer diameter "$d_e$" of the retaining portion 15 be larger than about 0.3 and preferably included between about 0.3 and about 0.7. For values smaller than 0.3, the deformability of the retaining portion 15 may be reduced too much for carrying out the engagement and disengagement operations of the detecting unit 9, with and from the anchoring body 10. In the embodiment shown, the ratio of the diameter "$N_1$" of the central cavity 18 to the outer diameter "$d_e$" of the retaining portion 15 is substantially equal to 0.5.

The ratio between the diameters "$N_2$" and "$N_1$" of the end portion 18b and the primary portion 18a is preferably included between 0.2 and 1. For higher values, the fitting constraint between the detecting unit 9 and anchoring body 10 can be too yielding. On the contrary, for smaller values the deformability of the retaining portion 15 can be insufficient to carry out the engagement and disengagement operations of the detecting unit 9, with and from the anchoring body 10. In the embodiment shown, this ratio is substantially equal to 0.5.

A recess 19 can be also advantageously formed in the retaining portion 15 for housing sensor 11, which recess opens towards the central cavity 18 and preferably extends around the geometric axis "X" of the anchoring body 10 by an angle "β" of a width included by way of indication between about 30° and about 100°, and substantially equal to 60° in the embodiment shown. The sizes and shape of the housing recess 19 are adapted to enable an optimal matching between the shape of the retaining portion 15 and that of sensor 11, so that plays or undesirable stresses with respect to the retaining portion 15 itself are eliminated.

Width values of angle "β" smaller than the stated values could cause an undesirable reduction in the deformability of the retaining portion 15. Higher width values could bring to an excessive weakening of the engagement constraint between the detecting unit 9 and anchoring body 10.

In a different embodiment, two recesses 19 (the second recess is not herein shown) can be provided that are diametrically opposite to each other for better distribution of the mass of the detecting unit that in this case will have a geometric configuration conforming in shape to said recesses 19.

Advantageously the base portion 13 is such structured that it conveniently protects the detecting unit 9 from stresses to which tyre 1 is submitted at the ground-contacting area, any risk of direct contact between the detecting unit 9 and the radially internal surface 1a of the tyre being eliminated.

To this aim, the base portion 13 is preferably provided to extend in a tapering conformation towards the perimetral groove 17, according to a height extension "$W_1$" measured in parallel to the geometric axis "X", that is included between 40% and 50% of the overall height "H" of the anchoring body 10. In more detail, the base portion 13 has a perimetral surface 13a tapering towards the perimetral groove 17, by an angle "α" included between about 15° and about 45°, corresponding to about 30° for example, relative to a plane containing the perimetral groove 17 itself. With angles smaller than 15° the perimetral surface 13a, due to deformations induced during rolling of the tyre, could come into contact with the antenna 12 thereby bringing about risks of damages and/or disengagements of the detecting unit 9 from the anchoring body 10. Angles of a value exceeding 45° would impose a reduction in the extension of the fastening surface 14, thereby impairing steadiness of adhesion to the radially internal surface 1a of the tyre. In addition, angles of a value exceeding 45° could generate points of stress concentration, due to the sudden stiffness variation induced by the presence of the anchoring body 10 itself, at the perimetral edge of the fastening surface 14, with consequent risks of giving rise to phenomena of separation of the anchoring body 10 from the radially internal surface 1a of the tyre.

It is also provided that the ratio of the overall height "H" of the anchoring body 10 to the maximum diameter "$D_{max}$" of the base portion 13 at the fastening surface 14 be preferably included between about 0.2 and about 0.3, in the example shown being equal to 0.24. In addition, the maximum diameter "$D_{max}$" is preferably included between 110% and 120% of the outer diameter "$d_2$" of the antenna 12. Smaller values of maximum diameter "$D_{max}$" as compared with the stated ones could induce an excessive deformability of the anchoring body 10 during rolling of the tyre, and, as a result, a reduction in the mechanical adhesion grip between the fastening surface 14 and inner surface 1a of the tyre itself. Higher values on the contrary would cause an increase in the transmitted forces between the tyre and anchoring body 10, due to the stiffness increase of said anchoring body 10, and would involve the risk of contacts between the radially external edge of the antenna 12 and the tapered perimetral surface 13a of the base portion 13.

It is also provided that at least at the perimetral groove 17 the base portion 13 should have a minimum diameter "$D_{min}$" included between the inner diameter "$d_1$" of the antenna 12 and the outer diameter "$d_e$" of the retaining portion 15. Higher values would transmit stresses to the antenna 12 during rolling of tyre 1, that would tend to remove the detecting unit 9 from the anchoring body 10.

In addition and advantageously, the fastening surface 14 of the base portion 13 may have a curvilinear extension, the radius of curvature of which is by way of indication at least as long as 280 mm when a tyre size 205/55 R16 is concerned, said curvilinear extension preferably corresponding to the curvature of the radially internal surface 1a of the tyre under inflated conditions.

To promote deformability of the anchoring body 10 in the interface between the fastening surface 14 and radially internal surface 1a of the tyre, the base portion 13 preferably has an auxiliary groove 20 formed in the fastening surface 14 and extending transversely of the circumferential extension of the tyre. In addition, this auxiliary groove 20 extends in a direction lying in a plane containing the housing recess 19 for sensor 11, for a depth included by way of indication between about 0.8 and about 2 mm.

Assembling of the detecting device 8 to the tyre can be carried out through fastening by adhesion of the fastening surface 14 to the radially internal surface 1a of the tyre, after said tyre has been made through the usual manufacturing and moulding-vulcanisation steps provided in the production cycle. Fastening can be obtained through gluing or vulcanisation, for instance through vulcanisation in situ of a skim coat of elastomeric material placed between the fastening surface 14 and the radially internal surface 1a of the tyre, preferably in such a manner that the fastening surface 14 is in a symmetrically centred position relative to the equatorial plane of the tyre and the auxiliary groove 20 preferably extends transversely of the circumferential extension of tyre 1.

Due to the particular shape of the anchoring body 10 and to the fact that the detecting unit 9 can be assembled to said anchoring body 10 subsequently, for carrying out said vulcanisation use of simple presses can provided that, through pressure generation, will press the anchoring body 10 against the radially internal surface 1a, while at the same time supplying the necessary heat. Subsequently, when vulcanisation has been completed, the detecting unit 9 is inserted.

In an alternative embodiment a polymer-based solution/rubber cement is provided that is laid/spread on the radially internal surface 1a of tyre 1 and the fastening surface 14 of the anchoring body 10 and subsequently cured through pressure and temperature application.

The above described processes are also advantageously adapted for application of the detecting device 8 to already produced tyres and possibly even to tyres already in use on motor vehicles.

Figure 10:
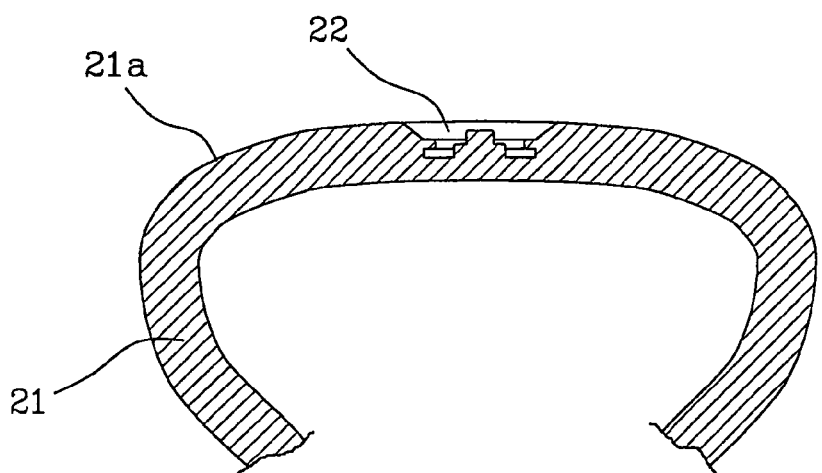
FIG. 10 is a diagrammatic section view of a toroidal support provided, on an outer surface thereof, with a forming cavity the shape of which matches that of the anchoring body of the detecting device.

Alternatively, the anchoring body 10 can be directly formed during the tyre manufacturing process, when this process involves formation of the constituent components directly on a toroidal support 21 conforming in shape to the inner surface 1a of the tyre. In more detail, to this aim provision is made for at least one forming cavity 22 matching the shape of the anchoring body 10 of the detecting device 8 to be set on the outer surface of said toroidal support 21. Introduced into said forming cavity 22 is a predetermined amount of raw elastomeric material (FIG. 10) sufficient to fill the cavity itself so that said cavity is flush with the outer surface 21a of the toroidal support 21.

Figure 11:
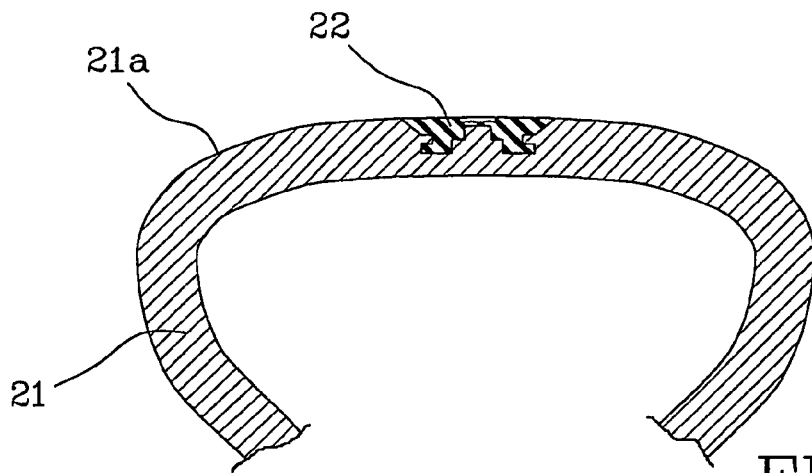
FIG. 11 shows the forming cavity in FIG. 10 filled with elastomeric material.
Figure 12:
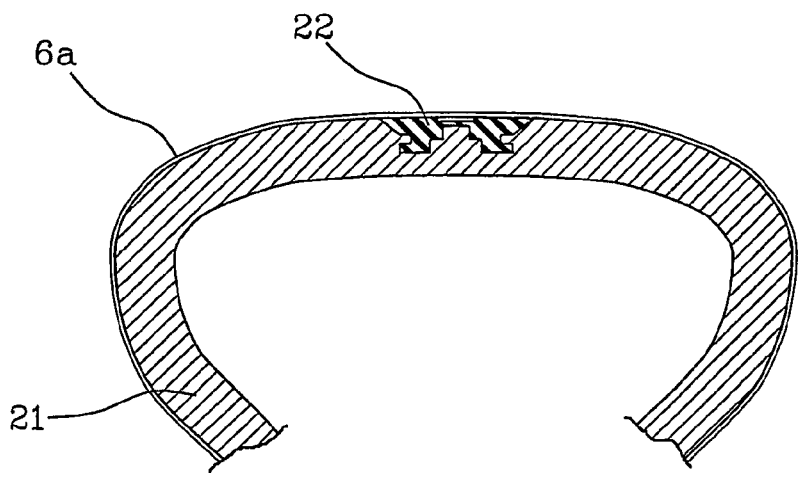
FIG. 12 shows a starting step of the forming operation of the carcass structure on the outer surface of the toroidal support.

Then formation of the carcass structure 2 of tyre 1 against the outer surface 21a of the toroidal support is started. In more detail, manufacture of the carcass structure 2 can start with formation of liner 6a obtained through winding of a continuous elongated element of raw elastomeric material into coils suitably distributed to cover the outer surface of the toroidal support 21 itself, as shown in FIG. 11. The subsequent steps of forming the carcass structure 2 and assembling the other constituent components of tyre 1 are not herein described as they can be carried out in a manner known by itself, as described for example in document EP-976535 in the name of the same Applicant.

When assembling has been completed, tyre 1 is introduced into a mould to be submitted to a vulcanisation step, following which the elastomeric material introduced into the forming cavity 22 will form the anchoring body 10, steadily joined to liner 6a defining the radially internal surface 1a of the tyre itself. When vulcanisation is over, the toroidal support 21 is removed from tyre 1 and manufacture of the detecting device 8 can be completed with engagement of the detecting unit 9 on the anchoring body 10.

The invention claimed is:

1. A tyre for vehicle wheels, comprising:
   a substantially toroidal carcass structure, comprising:
   at least one carcass ply having axially opposite end flaps in engagement with respective annular structures for anchoring to a mounting rim;
   a belt structure circumferentially applied to the carcass structure at a radially external position;
   a tread band circumferentially applied to the belt structure at a radially external position;
   a pair of sidewalls each extending between one of said annular anchoring structures and a side edge of the tread band;

a detecting device for detection of at least one characteristic parameter of said tyre which is applied to the carcass structure at a radially internal position, wherein the detecting device comprises:
a detecting unit comprising an antenna having an inner perimetral edge and a sensor operatively connected to said antenna; and
an anchoring body having:
a base portion with a fastening surface secured to a radially internal surface of the tyre;
a retaining portion associated with the base portion and having a top surface facing away from the fastening surface; and
a perimetral groove being formed between the base portion and retaining portion, so that the detecting unit is removably in engagement with the anchoring body through the inner perimetral edge of the antenna fitted in the perimetral groove following elastic deformation of the retaining portion;
wherein the anchoring body has an overall height measured between the fastening surface of the base portion and the top surface of the retaining portion of about 0.2 to about 1.5 times a maximum distance measured between two mutually spaced apart points along said inner perimetral edge.

2. The tyre as claimed in claim 1, wherein the anchoring body and the antenna of the detecting unit have a circular conformation.

3. The tyre as claimed in claim 1, wherein the anchoring body has a central cavity extending from the top surface toward the fastening surface.

4. The tyre as claimed in claim 3, wherein the diameter of the central cavity is 40% to 70% of a minimum diameter of the perimetral groove.

5. The tyre as claimed in claim 3, wherein the diameter of the central cavity is about 60% of the minimum diameter of the perimetral groove.

6. The tyre as claimed in claim 3, wherein the ratio of the diameter of the central cavity to the outer diameter of the retaining portion is about 0.3 to about 0.7.

7. The tyre as claimed in claim 3, wherein the central cavity has an axial extension at least equal to the axial size of the retaining portion added to the axial size of the perimetral groove.

8. The tyre as claimed in claim 3, wherein the central cavity has a primary portion extending from the top surface and an end portion having a smaller diameter than the diameter of the primary portion.

9. The tyre as claimed in claim 1, wherein at least one housing recess for the sensor is formed in the retaining portion.

10. The tyre as claimed in claim 3, wherein a housing recess opens toward the central cavity.

11. The tyre as claimed in claim 1, wherein a housing recess extends around a geometric axis of the anchoring body over an angular width of 30° to 100°.

12. The tyre as claimed in claim 1, wherein the perimetral groove extends according to a profile geometrically conforming in shape to the conformation of an inner perimetral edge of the antenna.

13. The tyre as claimed in claim 1, wherein the perimetral groove has a minimum diameter of 97% to 103% of an inner diameter of the antenna.

14. The tyre as claimed in claim 1, wherein the perimetral groove has a width of 97% to 103% of the thickness of the antenna.

15. The tyre as claimed in claim 1, wherein the base portion has a height extension of 40% to 50% of the overall height of the anchoring body.

16. The tyre as claimed in claim 1, wherein the retaining portion has a height of 90% to 110% of the width of the perimetral groove.

17. The tyre as claimed in claim 1, wherein the outer diameter of the retaining portion is larger than the inner diameter of the antenna.

18. The tyre as claimed in claim 1, wherein the outer diameter of said antenna is at least as large as the outer diameter of the retaining portion.

19. The tyre as claimed in claim 1, wherein the maximum diameter measured on the fastening surface of the base portion is 110% to 120% of the outer diameter of said antenna.

20. The tyre as claimed in claim 1, wherein at least at the perimetral groove, the base portion has a minimum diameter between the inner diameter of the antenna and the outer diameter of the retaining portion.

21. The tyre as claimed in claim 1, wherein the base portion has a conformation tapering toward the perimetral groove.

22. The tyre as claimed in claim 1, wherein the base portion has a perimetral surface tapering toward the perimetral groove by an angle of 15° to 45° relative to a plane containing the perimetral groove.

23. The tyre as claimed in claim 1, wherein the ratio of the overall height of the anchoring body to the maximum diameter of the base portion at the fastening surface is about 0.2 to about 0.3.

24. The tyre as claimed in claim 1, wherein the fastening surface of the base portion extends along a curvilinear surface extension.

25. The tyre as claimed in claim 1, wherein the base portion has an auxiliary groove formed in the fastening surface.

26. The tyre as claimed in claim 9, wherein an auxiliary groove extends in a direction lying in a plane containing the housing recess for the sensor.

27. The tyre as claimed in claim 26, wherein the auxiliary groove extends transversely of the circumferential extension of the tyre.

28. The tyre as claimed in claim 1, wherein said detecting unit comprises a support carrying at least said antenna.

29. The tyre as claimed in claim 1, wherein said detecting unit comprises a microprocessor for control and/or storage of said at least one characteristic parameter.

30. The tyre as claimed in claim 1, wherein the anchoring body is made of an elastomeric material having a hardness of about 35° to about 60° Shore A.

31. A tyre as claimed in claim 1, wherein the overall height measured between the fastening surface of the base portion and the top surface of the retaining portion is about 0.3 to about 0.6 times the maximum distance measured between two mutually spaced apart points along said inner perimetral edge.

32. A detecting device for detection of at least one characteristic parameter of a tyre, comprising:
a detecting unit comprising an antenna having an inner perimetral edge and a sensor operatively connected to said antenna;
an anchoring body having:
a base portion with a fastening surface adapted to be secured to a radially internal surface of the tyre;
a retaining portion associated with the base portion and having a top surface facing away from the fastening surface; and
a perimetral groove being formed between the base portion and retaining portion, so that the detecting unit is removably in engagement with the anchoring body through the inner perimetral edge of the antenna fitted in the perimetral groove following elastic deformation of the retaining portion;

wherein the anchoring body has an overall height, measured between the fastening surface of the base portion and the top surface of the retaining portion of about 0.2 to about 1.5 times a maximum distance measured between two mutually spaced apart points along said inner perimetral edge.

33. The device as claimed in claim 32, wherein the overall height measured between the fastening surface of the base portion and the top surface of the retaining portion is about 0.3 and about 0.6 times the maximum distance measured between two mutually spaced apart points along said inner perimetral edge.

34. The device as claimed in claim 33, wherein the anchoring body and the antenna of the detecting unit have a circular conformation.

35. The device as claimed in claim 32, wherein the anchoring body has a central cavity extending from the top surface toward the fastening surface.

36. The device as claimed in claim 35, wherein the diameter of the central cavity is 40% to 70% of a minimum diameter of the perimetral groove.

37. The device as claimed in claim 35, wherein the diameter of the central cavity is about 60% of the minimum diameter of the perimetral groove.

38. The device as claimed in claim 35, wherein the ratio of the diameter of the central cavity to the outer diameter of the retaining portion is about 0.3 to about 0.7.

39. The device as claimed in claim 35, wherein the central cavity has an axial extension at least equal to the axial size of the retaining portion added to the axial size of the perimetral groove.

40. The device as claimed in claim 35, wherein the central cavity has a primary portion extending from the top surface, and an end portion having a smaller diameter than the diameter of the primary portion.

41. The device as claimed in claim 32, wherein at least one housing recess for the sensor is formed in the retaining portion.

42. The device as claimed in claim 35, wherein a housing recess opens toward the central cavity.

43. The device as claimed in claim 32, wherein a housing recess extends around a geometric axis of the anchoring body over an angular width of 30° to 100°.

44. The device as claimed in claim 32, wherein the perimetral groove extends according to a profile geometrically conforming in shape to the conformation of the inner perimetral edge of the antenna.

45. The device as claimed in claim 32, wherein the perimetral groove has a minimum diameter of 97% to 103% of the inner diameter of the antenna.

46. The device as claimed in claim 32, wherein the perimetral groove has a width of 97% to 103% of the thickness of the antenna.

47. The device as claimed in claim 32, wherein the base portion has a height extension of 40% to 50% of the overall height of the anchoring body.

48. The device as claimed in claim 32, wherein the retaining portion has a height of 90% to 110% of the width of the perimetral groove.

49. The device as claimed in claim 32, wherein the outer diameter of the retaining portion is larger than the inner diameter of the antenna.

50. The device as claimed in claim 32, wherein the outer diameter of said antenna is at least as large as the outer diameter of the retaining portion.

51. The device as claimed in claim 32, wherein the maximum diameter measured on the fastening surface of the base portion is 110% to 120% of the outer diameter of said antenna.

52. The device as claimed in claim 32, wherein at least at the perimetral groove, the base portion has a minimum diameter between the inner diameter of the antenna and the outer diameter of the retaining portion.

53. The device as claimed in claim 32, wherein the base portion has a conformation tapering toward the perimetral groove.

54. The device as claimed in claim 32, wherein the base portion has a perimetral surface tapering toward the perimetral groove by an angle of 15° to 45° relative to a plane containing the perimetral groove.

55. The device as claimed in claim 32, wherein the ratio of the overall height of the anchoring body to the outer diameter of the base portion at the fastening surface is about 0.2 to about 0.3.

56. The device as claimed in claim 32, wherein the fastening surface of the base portion extends along a curvilinear surface extension.

57. The device as claimed in claim 32, wherein the base portion has an auxiliary groove formed in the fastening surface.

58. The device as claimed in claim 41, wherein an auxiliary groove extends in a direction lying in a plane containing the housing recess for the sensor.

59. The device as claimed in claim 32, wherein said detecting unit comprises a support carrying at least said antenna.

60. The device as claimed in claim 21, wherein said detecting unit comprises a microprocessor for control and/or storage of said at least one characteristic parameter.

61. The device as claimed in claim 21, wherein the anchoring body is made of an elastomeric material having a hardness of about 35° to about 60° Shore A.

62. A method of assembling a detecting device according to claim 32, to a tyre, comprising the steps of:

manufacturing the tyre;

moulding and curing the tyre; and securing the fastening surface of said detecting device, by adhesion to a radially internal surface of the tyre.

63. The method as claimed in claim 62, wherein the anchoring body is applied to a symmetrically centred position relative to an equatorial plane of the tyre.

64. The method as claimed in claim 62, wherein an element is cured between said fastening surface and radially internal surface of the tyre.

65. The method as claimed in claim 62, wherein the fastening surface is secured by gluing to the radially internal surface of the tyre.

66. The method as claimed in claim 62, wherein the fastening surface is secured to the radially internal surface of the tyre in such a manner that the auxiliary groove extends transversely of the circumferential extension of the tyre.

67. A method of manufacturing a tyre for vehicle wheels integrating a device for detecting at least one characteristic parameter of said tyre, said detecting device comprising a detecting unit removably in engagement with an anchoring body, comprising the steps of:

setting a toroidal support conforming in shape to the inner conformation of said tyre;

introducing raw elastomeric material into a forming cavity arranged on an outer surface of the toroidal support and the shape of which matches that of the anchoring body of the detecting device;

forming at least one carcass ply on the outer surface of the toroidal support;

assembling construction components of the tyre to the carcass ply;

curing the tyre so that the elastomeric material introduced into the forming cavity may form said anchoring body steadily associated with the radially internal surface of the tyre;

removing the toroidal support from the cured tyre; and engaging the detecting unit with the anchoring body following elastic deformation of a portion of the anchoring body.

* * * * *